United States Patent [19]

Shotwell

[11] 4,113,126
[45] Sep. 12, 1978

[54] BOAT LOADER AND UNLOADER CONSTRUCTION

[76] Inventor: Allen M. Shotwell, 207 Simpson-Howell Rd., Elizabeth, Pa. 15037

[21] Appl. No.: 826,266

[22] Filed: Aug. 19, 1977

[51] Int. Cl.² .............................................. B60P 3/10
[52] U.S. Cl. .................................. 214/450; 214/85.5
[58] Field of Search ................... 214/85.5, 450, 146.5; 296/23 B; 224/43.1 H

[56] References Cited

U.S. PATENT DOCUMENTS

| 2,584,163 | 2/1952 | Squires | 214/450 |
|---|---|---|---|
| 3,435,970 | 4/1969 | Sutton | 214/450 |
| 3,495,729 | 2/1970 | Kruse | 214/450 |
| 3,716,156 | 2/1973 | Risney | 214/450 |
| 3,927,779 | 12/1975 | Johnson | 214/450 |
| 3,930,584 | 1/1976 | Davis et al. | 214/450 |
| 3,976,213 | 8/1976 | Ball | 214/450 |

*Primary Examiner*—L. J. Paperner
*Attorney, Agent, or Firm*—Frease & Bishop

[57] ABSTRACT

A boat loader and unloader having a vertical column post adapted to be mounted on a usual trailer hitch at the rear of a vehicle. A horizontal bar is mounted on the top of the column post and has a pair of spaced roller assemblies mounted thereon. An elongated carriage formed by a pair of spaced parallel rail members is slidably and pivotally mounted on the horizontal bar by the roller assemblies. A reel assembly having a crank operated bar is adapted to be mounted transversely across and secured to the midportion of a boat. A take-up cable is attached to and extends between the reel bar and one end of the carriage. The other end of the carriage is adapted to be clamped to a boat transom when the boat is in a horizontal position on the ground with the carriage extending vertically downwardly from the top of the column post. Actuation of the crank operated bar winds the cable about the bar pivoting the boat about the clamped end of the carriage from a horizontal to a vertical upstanding position. The bottom of the boat then can be lifted upwardly manually to pivot the carriage from a vertical to an inverted horizontal position on top of the column post. The boat then is pushed forwardly manually to slide the carriage along the roller assembly to move the boat to a forward storage position on top of a vehicle with the front of the boat being supported by a vehicle mounted rack and with the rear of the boat being supported by the vertical column post. A reverse operation enables an individual to manually unload the boat from on top of the vehicle.

23 Claims, 25 Drawing Figures

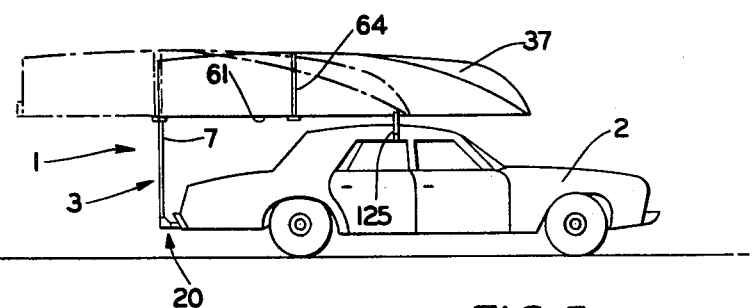
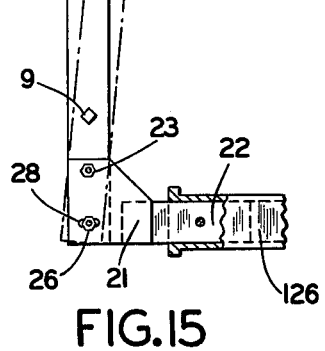
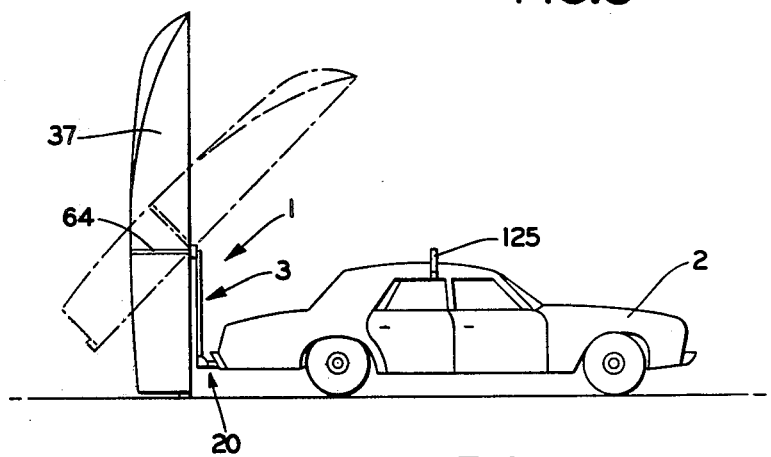
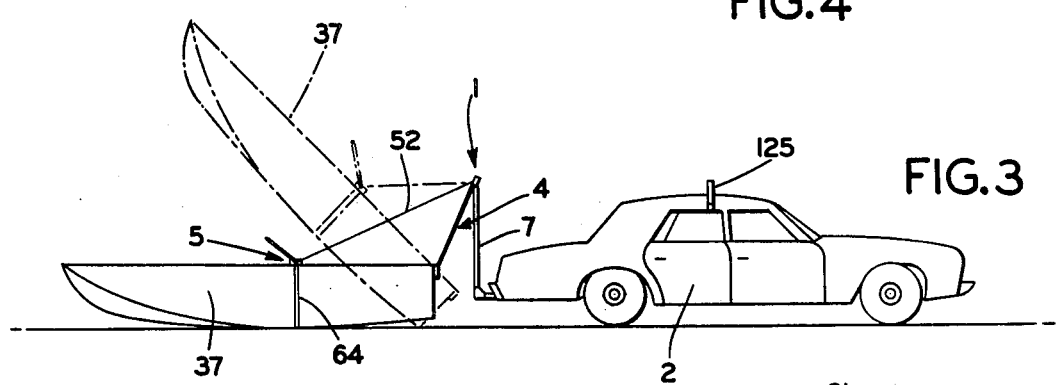
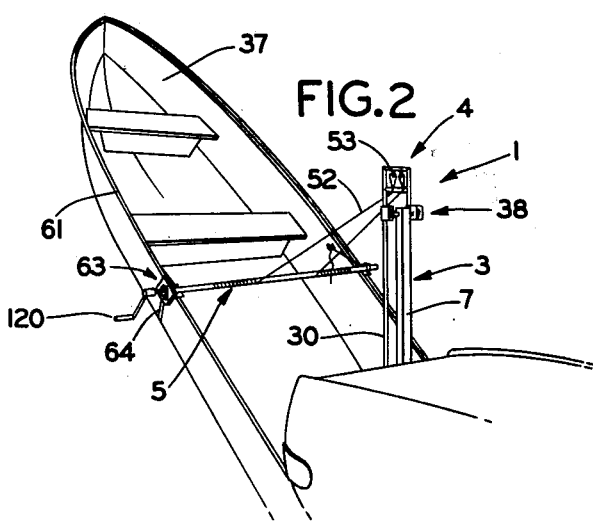
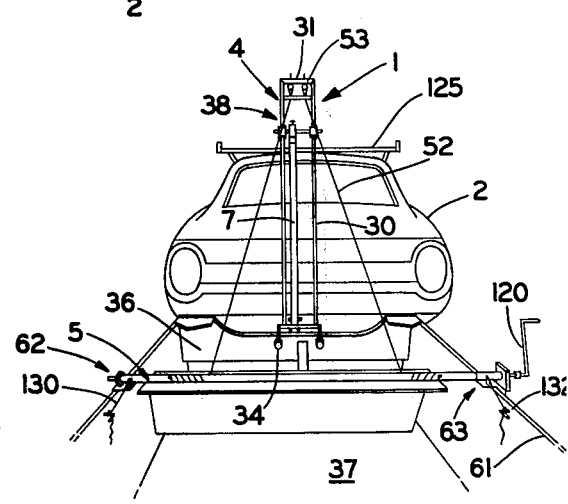

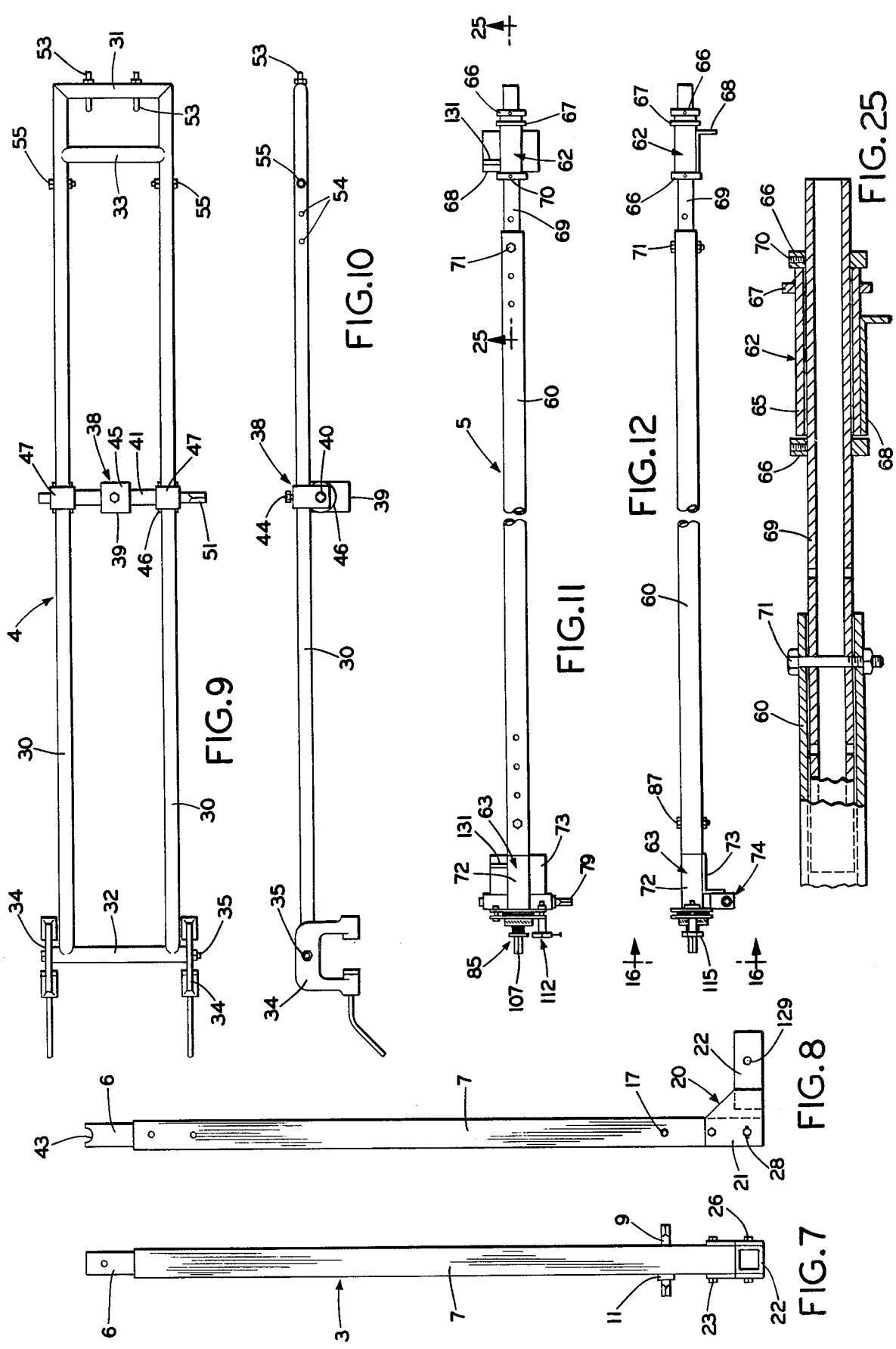

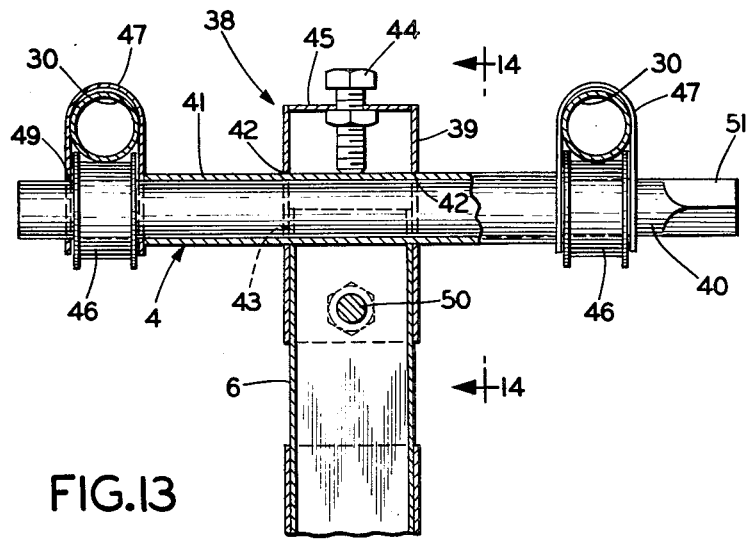
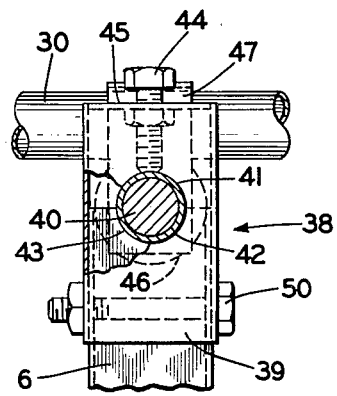
FIG.13
FIG.14
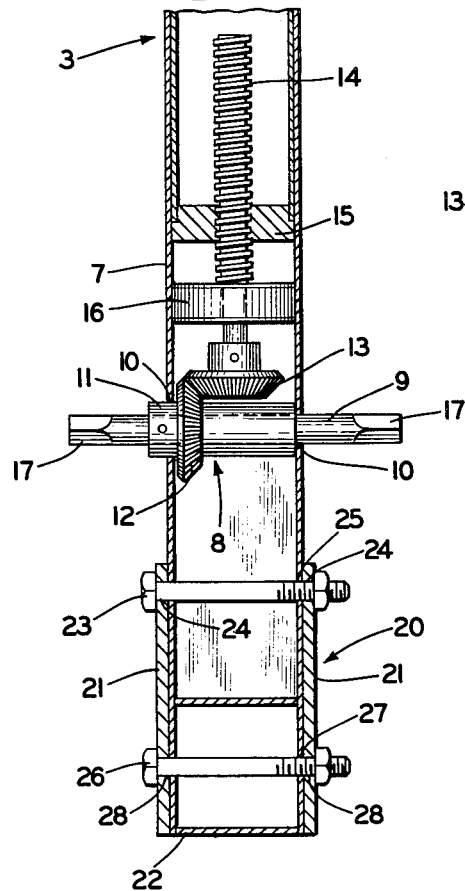
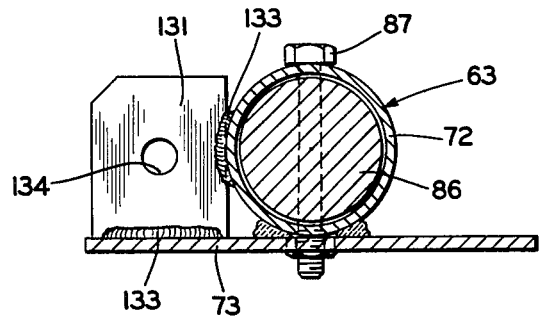
FIG.21
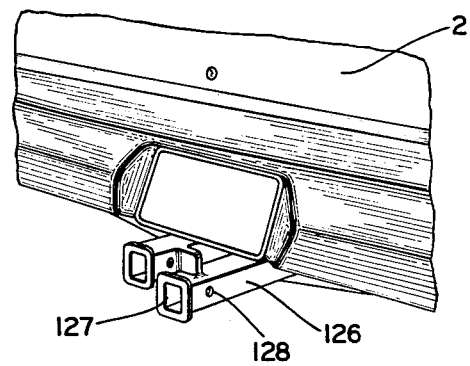
FIG.24
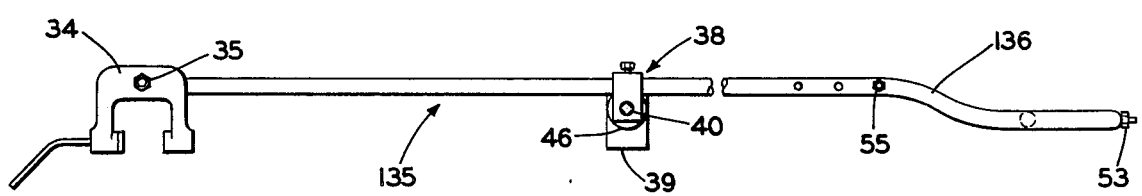
FIG.22

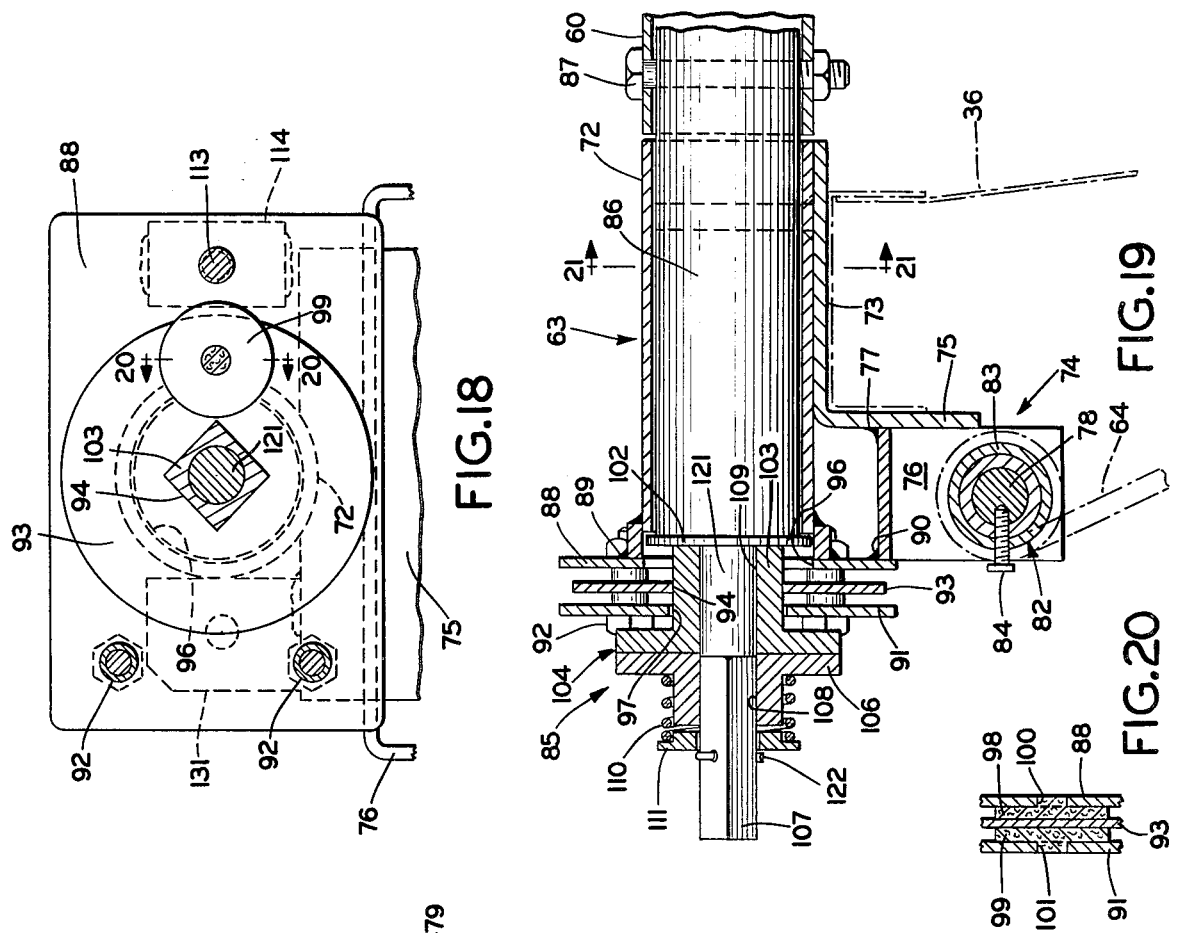
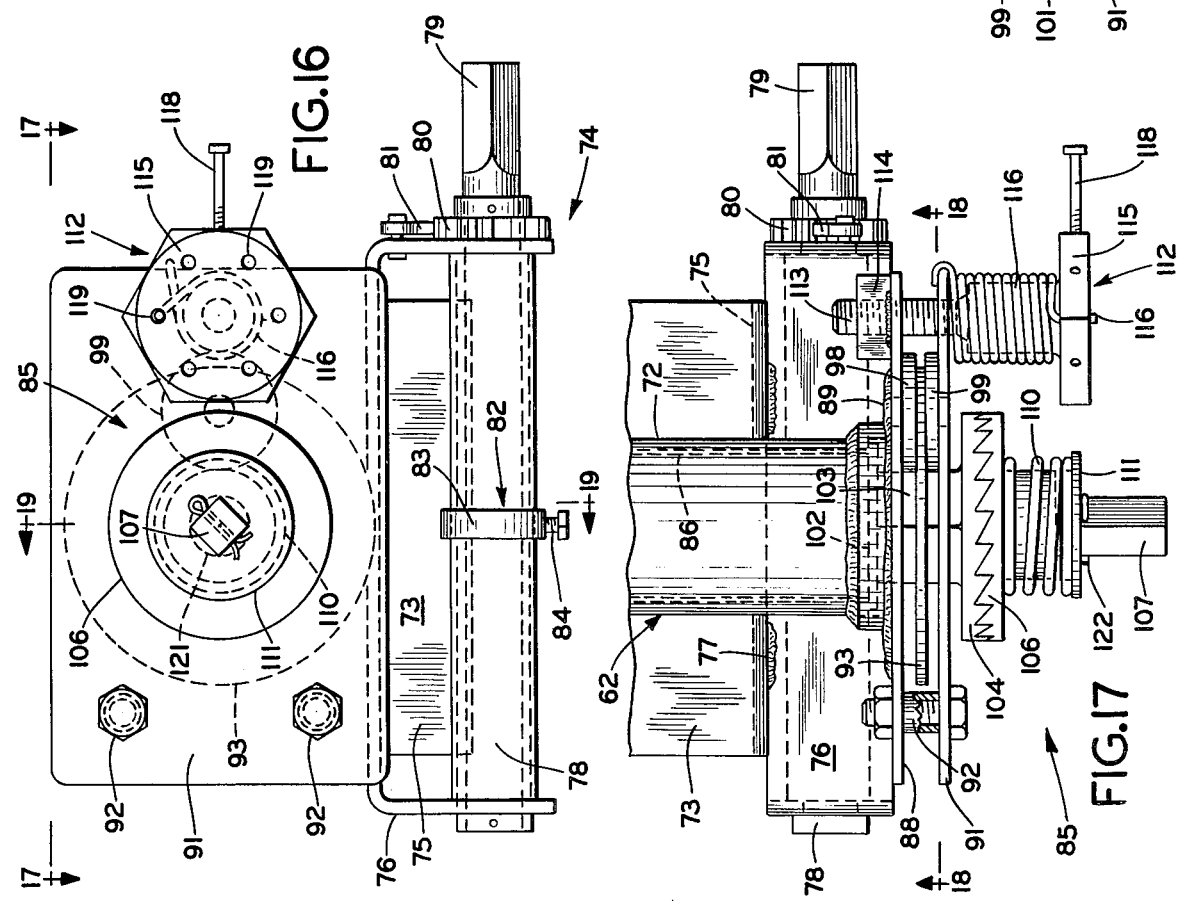

BOAT LOADER AND UNLOADER CONSTRUCTION

BACKGROUND OF THE INVENTION

1. Field of the Invention

The invention relates to a mechanism adapted to be removably mounted on a boat and usual trailer hitch which enables an individual to conveniently and easily load and unload a boat onto and off of a storage rack mounted on top of the vehicle without assistance.

2. Description of the Prior Art

Many fisherman and outdoor enthusiasts own relatively small boats commonly referred to as rowboats which are transported on a trailer or on a pair of racks on the vehicle roof. These boats may weigh as much as two hundred or two hundred fifty pounds, making it extremely difficult, if not impossible, for a single individual to load and unload the boat onto and off of the top of the vehicle. Many boaters prefer to transport their boat on the top of the vehicle rather than on a separate trailer due to the additional expense and bother of the trailer. Also, many boaters desire to pull camping trailers with their vehicles while transporting their boats, which is difficult if the boat is on a trailer.

Numerous devices have been designed for the purpose of loading and unloading a boat onto and off of the vehicle, some of which are designed to enable only a single individual to use the device. Examples of these prior art constructions are shown in U.S. Pat. Nos. 2,584,163, 3,435,970, 3,495,729, 3,927,779 and 3,930,584.

Many of these devices provide no winch or other mechanical advantage, thereby requiring excessive strength on the part of the operator for their use. Other devices require an electrically operated winch, thereby requiring electrical hookups to the vehicle's electrical system and subsequent drain on the vehicle battery. Other winch operated loader and unloaders assert a constant strain on the winch mechanism and subsequently on the operator thereof.

One of the primary disadvantages with known boat loader and unloaders is that many of their components must be attached by bolts, clamps, etc., to the vehicle, which defaces the vehicle as well as provide an unsightly appearance when the boat is not being transported. Other devices require extremely bulky and heavy components which are difficult to store and transport when not in use, and which require excess time for their installation on a vehicle and boat. Other known devices do not permit the same loader and unloader to be adapted to various styles, heights and configurations of vehicles, such as usual passenger cars, station wagons, trucks and vans, thus, requiring separate arrangements and configurations for the various vehicles. Also, in many locations the boat is usually launched and loaded at ramps which slope into the water for boat trailers where there is insufficient side clearance for certain types of loader and unloaders which are side operated.

No known boat loader and unloader construction of which I am aware provides a relatively simple mechanism which enables a single individual to load and unload a boat onto and off of a variety of vehicles with a minimum of effort.

SUMMARY OF THE INVENTION

Objectives of the invention include providing a boat loader and unloader construction which requires only a usual trailer hitch platform and receiver mounted on the rear vehicle frame, thereby eliminating special types of attachments and requires no alterations to the vehicle body or boat, and which eliminates any components being permanently attached by bolts or permanent fastening means on the boat or vehicle; providing such a construction which has adjustment means enabling it to be adaptable to various sizes and configurations of vehicles and boats without substantial modification to the device, and which adjustments are made easily by the individual boat owner; providing such a construction which can be removed easily from the vehicle and boat and stored in a relatively small space when not in use, which uses a manually actuated winch removably mounted directly on the boat eliminating attachment to the vehicle, in which the winch has a brake mechanism for positively controlling the rate of descent of the boat when being unloaded, and which brake prevents accidental release of the winch's position providing greater safety to the operator; providing such a construction comprised of a minimum number of components, most of which are easily formed of readily available steel tubular members; providing such a construction which is removably mounted on a boat, whereby the weight of the boat is used to the operator's advantage during the loading and unloading procedure; and providing such a construction which is of a simple construction and configuration, which reduces maintenance and repair problems, which achieves the stated objectives in a simple, effective and inexpensive manner, which provides a safe and effective means for an individual to load and unload a boat onto and off of a variety of vehicles, and which solves problems and satisfies needs existing in the art.

These objectives and advantages may be obtained by the boat loader and unloader construction, the general nature of which may be stated as including vertical column means having upper and lower ends, said lower end being adapted to be mounted on the rear of a vehicle and with said upper end being generally level with the top of the vehicle; carriage means having first and second ends, said carriage means being pivotally mounted on the upper end of the column means for swinging movement between a lower vertical position and an upper horizontal position and slidably mounted on said upper column end for generally horizontal movement between retracted and forward positions; clamp means mounted on the first end of the carriage means for clampingly engaging a transom of a boat; reel means adapted to be mounted on a central portion of a boat; cable means attached to and extending between the reel means and the second end of the carriage means, said cable means being controlled by the reel means to move a boat attached to the reel means between a horizontal upright position and a vertical upstanding position; and the carriage means being adapted to pivot about the upper end of the column means for swinging movement of a boat between a vertical upstanding position and an inverted horizontal position, and with said carriage means being adapted to move horizontally along the column means upper end for moving an inverted boat between retracted and forward positions on top of a vehicle.

BRIEF DESCRIPTION OF THE DRAWINGS

A preferred embodiment of the invention — illustrative of the best mode in which applicant has comtemplated applying the principles — is set forth in the following description and shown in the drawings, and is particularly and distinctly pointed out and set forth in the appended claims.

FIG. 1 is a fragmentary diagrammatic end view showing the improved boat loader and unloader construction mounted on the rear of a vehicle and connected to a boat prior to it being loaded on the vehicle;

FIG. 2 is a fragmentary diagrammatic view similar to FIG. 1 showing the boat being partially raised during a loading operation;

FIGS. 3, 4 and 5 are diagrammatic side views showing in solid and in dot-dash lines, six stages during the loading and unloading of a boat on a vehicle by the improved boat loader and unloader construction;

FIG. 7 is an end elevational view of the vertical column post component of the boat loader and unloader construction;

FIG. 8 is a side elevational view of the vertical column post of FIG. 7;

FIG. 9 is a top plan view of the carriage component of the boat loader and unloader construction;

FIG. 10 is a side elevational view of the carriage of FIG. 9;

FIG. 11 is a top plan view of the reel assembly component of the boat loader and unloader construction;

FIG. 12 is a front elevational view of the reel assembly of FIG. 11;

FIG. 13 is an enlarged vertical sectional view of the column post with the carriage shown in section mounted on the upper end thereof;

FIG. 14 is a sectional view taken on line 14—14, FIG. 13;

FIG. 15 is a fragmentary view similar to FIG. 8, with portions broken away and in section, showing the vertical post mounted on a trailer hitch;

FIG. 16 is an enlarged end elevational view of the reel assembly looking in the direction of arrows 16—16, FIG. 12;

FIG. 17 is a top plan view of the crank and brake mechanism portion of the reel assembly looking in the direction of arrows 17—17, FIG. 16;

FIG. 18 is a fragmentary sectional view taken on line 18—18, FIG. 17;

FIG. 19 is a fragmentary sectional view taken on line 19—19, FIG. 16, with portions of the boat transom and attachment sling shown in dot-dash lines;

FIG. 20 is a fragmentary sectional view taken on line 20—20, FIG. 18;

FIG. 21 is a fragmentary sectional view taken on line 21—21, FIG. 19;

FIG. 22 is a side elevational view similar to FIG. 10, showing a modified form of the carriage component;

FIG. 24 is a fragmentary perspective view showing a double trailer hitch mounted on the rear of a vehicle; and FIG. 25 is an enlarged fragmentary sectional view taken on line 25—25, FIG. 11.

Similar numerals refer to similar parts throughout the drawings.

DESCRIPTION OF THE PREFERRED EMBODIMENT

Figure 6:
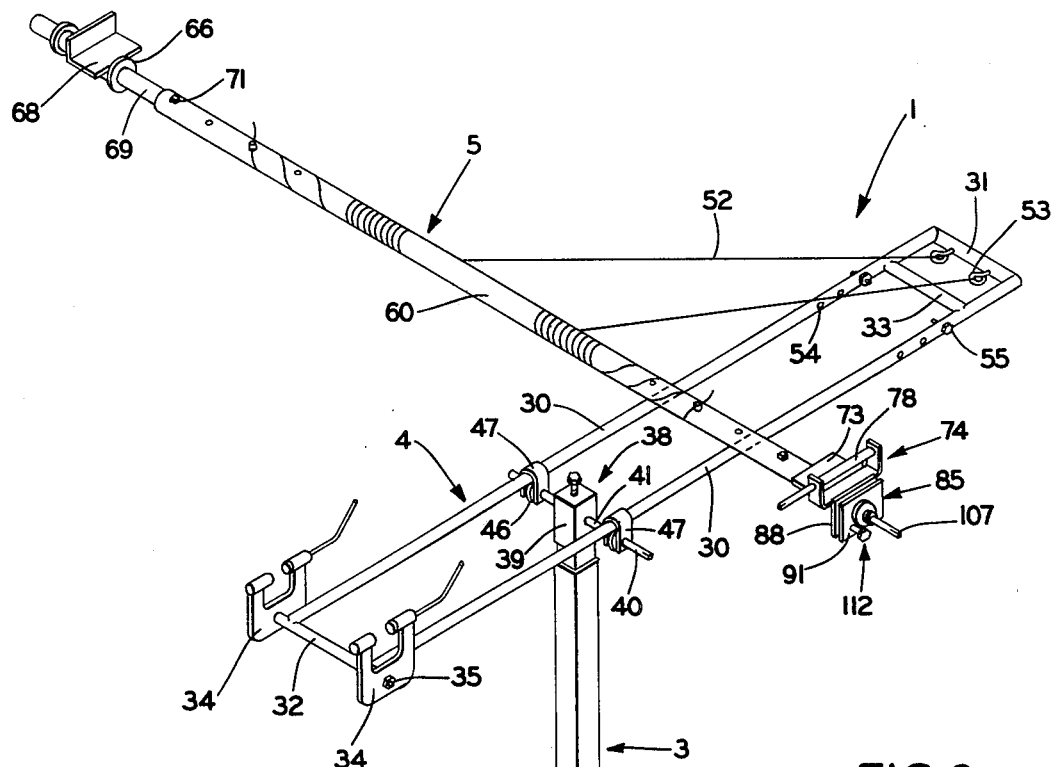
FIG. 6 is an enlarged diagrammatic perspective view showing the three main components of the boat loader and unloader construction.

The improved boat loader and unloader construction is indicated generally at 1, and is shown in FIGS. 1–5 mounted on a vehicle 2, with a boat loading and unloading procedure being shown in solid and dot-dash lines. The improved construction 1 is shown in greater detail in assembled condition in FIG. 6. Construction 1 includes three main components, a vertical column post indicated generally at 3 (FIGS. 7 and 8), a carriage indicated generally at 4 (FIGS. 9 and 10), and a reel assembly indicated generally at 5 (FIGS. 11 and 12).

Post 3 includes inner and outer hollow tubular members 6 and 7 which are telescopically slidably mounted with respect to each other, and shown particularly in FIG. 13. Members 6 and 7 have a rectangular cross-sectional configuration and are vertically adjustable with respect to each other by a crank assembly, indicated generally at 8.

Crank assembly 8 includes a shaft 9 which is rotatably mounted in a pair of aligned openings 10 formed in outer member 7. A bevel gear 12 is mounted on shaft 9 by a pinned retainer sleeve 11. Gear 12 engages another bevel gear 13 which is affixed to the lower end of a threaded shaft 14 which in turn is threadably engaged with a nut 15 attached to the lower end of inner member 6. A bearing 16 is mounted within outer member 7 for rotatably mounting and retaining shaft 14 therein. The ends 17 of crankshaft 9 are squared for receiving an operating crank for vertically adjusting inner member 6 with respect to outer member 7 by rotation of shaft 9 and the corresponding movement of threaded shaft 14 through nut 15.

The lower end of outer member 7 is mounted in a bracket 20 which has a pair of side plates 21 which are welded to a tubular sleeve 22. An upper bolt 23 attaches the top portions of plates 21 to outer member 7 through complementary holes 24 and 25 formed in plates 21 and outer member 7, respectively. A second bolt 26 extends through holes 27 formed in the bottom portion of outer member 7 and through aligned slots 28 formed in side plates 21. Slots 28 enable post 3 to be pivoted slightly about upper bolt 23 to provide limited vertical adjustment to post 3 to compensate for any misalignment of the vehicle hitch on which loader and unloader construction 1 is mounted.

Carriage 4 (FIGS. 6, 9 and 10) has a pair of spaced parallel tubular rails 30 which are connected at their ends by cross members 31 and 32 and by a reinforcing brace 33. A pair of C-clamps 34 are pivotally mounted by bolts 35 to the ends of cross member 32 and are adapted to clampingly engage the transom 36 of a boat 37. A vertical post end cap roller assembly, indicated generally at 38, is movably mounted on and extends between rails 30.

End cap assembly 38 (FIGS. 13 and 14) includes a rectangular-shaped end cap 39 which is similar in cross section and dimension to outer tubular member 7, and which is adapted to be telescopically mounted on the upper end of inner tubular members 6. A shaft 40 is telescopically rotatably mounted within an outer sleeve 41. Sleeve 41 extends through a pair of horizontally aligned complementary openings 42 formed in end cap 39, and is adapted to rest within U-shaped grooves 43 (FIG. 8) formed in the top end of inner member 6. Sleeve 41 is secured in a predetermined fixed position with respect to end cap 39 and post 3 by a clamping bolt 44 mounted in top wall 45 of end cap 39.

A pair of grooved rollers 46 are fixed to shaft 40 for rotation therewith and are partially covered by upper shroud-like members 47 which are freely rotatable with respect to outer sleeve 41. The outer ends of shaft 40 extend through openings 49 formed in the leg portions of shrouds 47 so as to be freely rotatable with respect to shrouds 47 and outer sleeve 41, with rollers 46 also rotating within shrouds 47 upon rotation of shaft 40.

Tubular rails 30 are adapted to move along rollers 46 and are retained in position by shrouds 47 when end cap assembly 38 is mounted on post 3 and secured to inner member 6 by an attachment bolt 50 (FIG. 14). Bolt 50 extends through complementary aligned openings formed in the lower portion of end cap 39 and the top portion of inner tubular member 6. At least one end 51 of shaft 40 is squared for receiving a manually actuated crank.

A pair of eye bolts 53 are mounted on cross member 31 to which the ends of a boat lowering and raising cable 52 are attached. A plurality of aligned holes 54 are formed in the outer portions of rails 30 adjacent cross member 33 for receiving stop bolts 55 which limit the travel of carriage 4. The position of stop bolts 55 is dependent upon the length and balance of the particular boat 37 to be used with boat loader and unloader construction 1.

Carriage 4 is slidably movable along end cap roller assembly 38 within shrouds 47 and is pivotally mounted with respect to end cap sleeve 41 and post 3 by the pivotal mounting of shrouds 47 on sleeve 41.

Reel assembly 5 (FIGS. 11 and 12) includes a cable take-up tube 60 adapted to be rotatably mounted transversely on rim 61 of boat 37 by a pair of pad bearings 62 and 63. Reel assembly 5 is adapted to be held in position on boat 37 by a sling 64 which is connected to the ends of cable take-up tube 60 after the sling is looped under the bottom of the boat. Bearing 62 (FIG. 25) includes a cylindrical outer housing 65 having an annular flange 67 formed on the outer end thereof about which sling 64 is looped for mounting reel assembly 5 on boat 37. An L-shaped bracket 68 is welded to bearing housing 65 and is adapted to engage boat rim 61. A take-up reel shaft 69 extends through housing 65, and is adjustably connected to one end of take-up tube 60 by a bolt 71. Shaft 69 is positioned with respect to housing 65 by a pair of retainer rings 66 which are secured to shaft 69 on each end of housing 65 by setscrews 70.

Bearing 63 (FIGS. 16 and 19) includes an outer cylindrical housing 72 and an L-shaped boat rim engaging bracket 73. A sling take-up mechanism indicated generally at 74, is mounted on the downwardly depending leg 75 of bracket 73 for tightening sling 64 about the bottom portion of boat 37. Take-up mechanism 74 includes a U-shaped bracket 76 which is attached by welds 77 to bracket leg 75. A shaft 78 is rotatably mounted on U-shaped bracket 76 and is adapted to be rotated by a manually actuated crank engageable with squared shaft end 79. A ratchet 80 is mounted on shaft 78 and is held in a selected sling-tightened position by a spring biased detent 81 which is pivotally mounted on one leg of bracket 76. A sling attaching post 82 is mounted on the midpoint of shaft 78 and may consist of a ring 83 which is clamped on shaft 78 by a bolt 84.

Sling 64 preferably is of a closed loop configuration with one end being looped behind flange 67 of bearing housing 65 and with the other loop end being engaged with bolt 84 on sling take-up mechanism 74. Rotation of shaft 78 winds sling 64 about shaft 78 until reel assembly 5 is clamped sufficiently tight in a transversely extending position across the center portion of boat 37. Detent 81 is always maintained in engagement with ratchet 80 to lock shaft 78 in the sling-tightened position by its biasing spring (not shown).

A crank and brake mechanism, indicated generally at 85, is mounted on an end of cable take-up tube 60 adjacent pad bearing 63, and is shown particularly in FIGS. 17–20. Mechanism 85 enables an individual to easily and positively control the position and movement of boat 37 while it is being loaded and unloaded on a vehicle, particularly during the critical phase when the boat is off the ground and vehicle roof, that is, the particular phases or boat locations shown in FIGS. 2, 3 and 4.

Mechanism 85 includes a shaft 86 that is mounted in and extends through bearing housing 72, and which is connected to cable take-up tube 60 by one or more bolts 87. An annular shoulder 102 is formed on shaft 86 and is adapted to engage the circular end of bearing housing 63 (FIG. 19). An inner disc brake plate 88 is welded at 89 to the outer end of housing 72 and also may be welded at 90 to sling take-up mechanism 74. A second or outer disc brake plate 91 is movably mounted on a pair of spacer bolts 92 outboard of inner plate 88 for inward and outward axial movement with respect to plate 88. A brake disc 93 is positioned between brake plates 88 and 91 and is formed with a square central opening 94.

An inner ratchet disc 104 having a squared axially extending collar portion 103 and a smooth inner bore 109 is rotatably mounted on shaft 86 and is located at the outer end of bearing housing 72 in butting engagement with shaft shoulder 102. Collar 103 extends through the complementary squared opening 94 of brake disc 93 and through axially aligned circular openings 96 and 97 formed in brake plates 88 and 91, respectively. Brake plate openings 96 and 97 are larger in diameter than the diagonal dimension of the squared collar portion 103 of disc 104, whereby disc 104 will rotate freely within openings 96 and 97. Brake plates 88 and 91 preferably have a rectangular configuration with disc 93 being circular.

A pair of friction brake pads 98 and 99 (FIG. 20) are mounted within small circular holes 100 and 101 of brake plates 88 and 91, respectively, for frictionally engaging disc 93 to prevent rotation of cable take-up tube 60 until the brake is manually released to permit unwinding of cable 52 from take-up tube 60.

Inner ratchet disc 104 is rotatably mounted on a reduced cylindrical outer end portion 121 of shaft 86 and a second or outer ratchet disc 106 is mounted on the squared outer end 107 of shaft 86 for rotation with shaft 86 by means of a squared central opening 108 complementary to the squared configuration of shaft end 107. A coil spring 110 is mounted between outer ratchet disc 106 and a retaining washer 111 and biases outer ratchet disc 106 toward meshing engagement with inner ratchet disc 104. A cotter pin 122 maintains washer 111 and spring 110 on shaft end 107.

A spring loaded brake control mechanism, indicated generally at 112, is mounted on outer brake plate 91 and is shown particularly in FIGS. 16 and 17. Mechanism 112 includes a threaded bolt 113 which is engaged at its inner end with a nut 114 which is welded to the inner face of brake plate 88. The outer end of bolt 113 is attached to a hexagonal-shaped member 115. A torsion coil spring 116 is telescopically mounted on the outer portion of bolt 113 and applies constant brake load on plate 91. A control lever 118 is mounted on and extends outwardly from member 115 for rotating bolt 113, which in turn controls release of the brake mechanism of take-up reel shaft 69. A plurality of holes 119 are formed in member 115 for receiving an end of spring 116 to provide adjustment in the tension of spring 116.

The operation of crank and brake mechanism 85 and brake applying mechanism 112 is as follows. A manually actuated crank 120 (FIG. 1) is placed on squared end 107 of shaft 86, and when rotated in a clockwise direction (FIG. 16), rotates shaft 86 and take-up tube 60 and winds cable 52 about tube 60, as illustrated in FIG. 2. Shaft 86 rotates freely within disc collar 103 and bushing 63, and outer ratchet disc 106 slips or "clicks" past inner ratchet 104 which is stationary due to it being held by the squared engagement of disc collar 103 and brake disc 93, since disc 93 is continuously gripped by friction pads 98 and 99 of brake plates 88 and 91.

Cable 52 is wound on tube 60 until boat 37 reaches the upstanding full line position of FIG. 4. Spring 116 maintains brake mechanism 85 in engaged position preventing tube 60 from turning in a counterclockwise direction and accidentally lower boat 37. Outer ratchet disc 106 is prevented from counterclockwise rotation by its toothed engagement with inner ratchet disc 104. Inner disc 104 is prevented from counterclockwise rotation since disc collar 103 cannot rotate because of the squared connection with clamped disc 93.

Assume that boat 37 is in the position of FIG. 2 and an individual desires to lower it toward the ground. The operator merely needs to release brake 112 by a slight counterclockwise movement of lever 118, permitting the weight of the boat to rotate tube 60 counterclockwise unwinding cable 52. The operator can stop the descent of the boat at any stage by simply releasing lever 118 whereupon spring 116 will reapply the braking force on disc 93. When the brake is released and cable 52 is unwound, ratchet discs 104 and 106 and brake disc 93 all rotate in unison.

FIGS. 1–5 diagrammatically illustrate the operation of loader and unloader construction 1. In a loading procedure boat 37 is placed on the ground in an upright position with transom 36 being adjacent the rear of vehicle 2. Carriage 4 is pivoted downwardly to a vertical position and C-clamps 34 are secured to transom 36. Reel assembly 5 is mounted on and extends transversely across rim 61 of the boat and sling 64 is placed about the bottom of the boat and tightened by sling take-up mechanism 74, as discussed above. A pair of cables 52 extend between eye-bolts 53 and are secured to cable take-up tube 60. Two cables provide greater stability during loading and unloading by reducing side movements of the boat.

Crank 120 (FIGS. 1 and 2) is placed on shaft end 107 and is rotated manually, pivoting boat 37 upwardly from its horizontal full line position of FIG. 3 to an intermediate partially raised position shown in dot-dash lines, which position is similar to that of FIG. 2. C-clamps 34 will pivot about their mounting bolts 35 and carriage 4 may move or pivot slightly on rollers 46 and shroud members 47. Continued operation of crank 120 winds cables 52 about tube 60 pivoting boat 37 to the upright vertical position shown in full lines in FIG. 4. In this vertical position the weight of the boat is supported entirely by vertical post 3 through its pivotal connection with rails 30 of carriage 4.

The operator then lifts upwardly outwardly on the rear of boat 37, pivoting carriage 4 about horizontal end cap sleeve 41. Only a minimum of effort is required to pivot the boat upwardly since reel assembly 5 is located generally at the midpoint or center of gravity of boat 37.

Upon boat 37 reaching the dot-dash line position of FIG. 4, the boat's center of gravity shifts forwardly of vertical post 3, whereby the boat continues downwardly to the horizontal dot-dash line position of FIG. 5. Again, only a minimum amount of effort on the operator's part is required to control the weight of the boat's descent due to the location of reel assembly 5 adjacent the boat's center of gravity.

A usual vehicle storage rack 125 is mounted on the top of vehicle 2 in the proper position to engage the bow of the boat upon it reaching the dot-dash line position of FIG. 5. The operator then shoves forwardly horizontally on the rear of the boat to move the boat from the dot-dash to the full line positions of FIG. 5.

This forward movement is facilitated due to the sliding and rolling engagement of carriage rails 30 with rollers 46. Preferably a roller (not shown) may extend transversely across the vehicle mounted on rack 125 to facilitate this horizontal sliding movement of boat 37.

Boat 37 upon reaching the forward or full line position of FIG. 5, is supported entirely on vertical post 3 and rack 125, with the bow of the boat being secured by additional tie-down straps.

The unloading procedure is basically the reverse of the above described loading procedure. The operator pulls backwardly on the rear of the boat and upon the boat reaching the dot-dash line position of FIG. 5, pulls downwardly on the rear of the boat. This downward movement pivots the bow upwardly through the dot-dash line position of FIG. 4 until it reaches the full line vertical upright position.

The individual then rotates brake control mechanism 112 counterclockwise a very small amount to reduce the clamping engagement of brake friction pads 98 and 99 with respect to brake disc 93, whereupon the boat's weight rotates take-up tube 60 and unwinds cables 52 therefrom until the boat assumes a horizontal at-rest position on the ground. The rate of descent is controlled easily by manual manipulation of brake control lever 118.

Construction 1 is mounted on a vehicle by tubular sleeve 22 (FIG. 6) which is slidably received within a usual trailer hitch 126 (FIG. 24) which is mounted beneath the rear of a vehicle on the vehicle frame. This type of hitch is commonly referred to as a hitch platform and receiver and is used for many trailer hitches. Sleeve 22 is slidably inserted within a complementary square opening 127 and is retained therein by a pin (not shown) which is inserted through aligned openings 128 and 129 formed in trailer hitch 126 and sleeve 22, respectively. Thus, once such a trailer hitch is mounted on the vehicle frame, no further attachments or other components, except a usual car rack 125, are required on a vehicle for use of improved construction 1. Bolt 26 then is tightened in an adjusted position in slots 28 of bracket side plates 21 to vertically align post 3 so as to compensate for any misalignment of hitch 126 on the vehicle.

The vertical height of column 3 is adjusted by rotation of crank operated shaft 9 which raises and lowers inner tubular member 6 together with end cap roller assembly 38. Column 3 is adjusted so that the height of rollers 46 is generally level with the top of vehicle rack 125, whereby boat 37 when in its stored position of FIG. 5, is level. Column 3 need not be adjustable for many applications, since many passenger vehicles have a basic roof height. Thus, if desired, post 3 could be a one-piece tubular member without affecting the concept of the invention.

Reel assembly 5 is mounted on boat 37 by sling 64 without any permanent mounting means being required on the boat. Reel assembly 5 is prevented from movement along boat frame 61 by short sections of tie-down ropes 130 (FIG. 1) which extend between a plate 131 (FIG. 21) and the boat oar locks 132. Plates 131 are attached by welds 133 to reel assembly bearing housings 62 and 63 and L-shaped mounting brackets 68 and 73. A hole 134 preferably is formed in each of the plates 131 for securing tie-down ropes 130 therein.

Reel assembly 5 is positioned across the boat's frame just rearward of the center of gravity whereby the boat, when reaching the dot-dash line position in FIG. 4 will move automatically downwardly at a slow rate of descent, requiring only a slight restraining force on the rear of the boat by the operator.

Many boat owners desire to pull a camping trailer and transport their boat at the same time. Many prior boat loader and unloader constructions do not enable the boat owner to accommodate both the boat and trailer without time consuming and excessive manipulations of the loader and unloader components. FIG. 24 illustrates a double hitch platform and receiver construction which enables post 3 and end cap assembly 38 to be mounted in one of the hitch tubular openings 127 with the other hitch opening being adapted to receive a usual trailer hitch simultaneously. This double hitch arrangement enables both the loader and unloader construction 1 to be used, as well as enabling a trailer to be pulled by the vehicle without any disassembling of construction 1.

Column 3 preferably will be placed in the off-center trailer hitch opening with the trailer being mounted in the center hitch opening. When post 3 is mounted in the off-center hitch opening, carriage 4 is still maintained on center with respect to the vehicle roof and storage rack 125 by horizontal adjustment of end cap sleeve 41. Sleeve 41 is adjusted on post 3 by temporarily loosening clamping bolt 44 and sliding sleeve 41 within openings 42 until sleeve 41 is in its adjusted position. This particular off-center mounting arrangement of post 3 is shown in FIG. 1 and enables a usual trailer to be pulled "on center" at the rear of the vehicle which is most critical. This double hitch arrangement still enables the boat loader and unloader construction 1 to be retained on the vehicle and to load and unload boat 37 "on center" with the vehicle by a simple sliding adjustment of sleeve 41.

Figure 23:
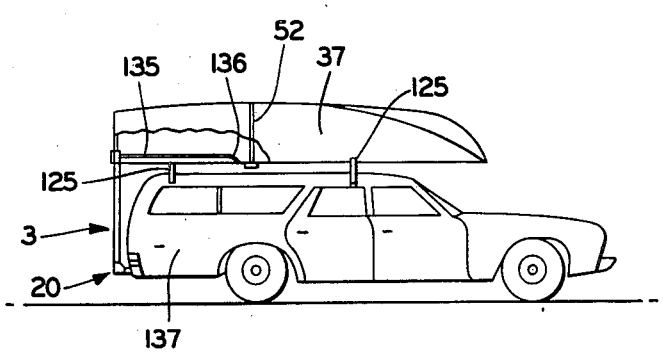
FIG. 23 is a diagrammatic view, similar to FIG. 5, showing the modified carriage component of FIG. 22 mounted on a van-type vehicle.

FIG. 22 shows a modified carriage, indicated at 135. Carriage 135 is similar in all respects to carriage 4, except that its forward end is offset downwardly with respect to the remaining portion of the side rails by a curved rail section 136. Modified carriage 135 is adapted for use on a station wagon or van-type vehicle 137 (FIG. 23) in which a pair of roof racks 125 or usual top roof luggage rack is used. This offset end portion permits carriage 135 to avoid contact with the rearmost rack 125 upon horizontal movement of the boat, as shown in FIG. 5, and enables boat 37, when in stored position, to rest on both racks 125. At this time, post 3 may be removed by separating the end cap assembly 38 from the upper post end. The end cap assembly will remain on carriage 4 and post 3 can be stored in the vehicle until needed to remove the boat. When used on a van-type vehicle, post 3 will be raised approximately one or two feet by manipulation of crank assembly 8 after the boat has reached the upright vertical position shown in full line, FIG. 4. This then enables the boat to be pivoted forwardly past the top rear end of the vehicle.

Improved boat loader and unloader construction 1 has a number of advantages not found in many known loader and unloader constructions. Reel assembly 5 can be adjusted easily to accommodate various boat widths by inserting bolt 71 within a selected bolt receiving hole 56 of take-up tube 60 to adjust the axial length of reel assembly 5 (FIGS. 11, 12 and 25). No fastening means or holes of any type are required to be mounted on or formed in boat 37 since reel assembly 5 is easily mounted on and removed from boat 37 by sling 64 and sling take-up mechanism 74. Likewise, tie-down ropes 130 extend from reel take-up plates 131 to any convenient part of the boat, such as its oar locks. Carriage 4 also requires no permanent mounting bolts or components on the boat or vehicle and is secured to a boat transom by usual C-clamps 34, similar to clamps used to mount an outboard motor to the boat transom. The entire construction 1, as shown in FIG. 6, is mounted on the vehicle by a simple telescopic engagement of tube 22 within a trailer hitch which is secured by a locking pin extending through the telescoped members. Slots 28 in bracket 20 also provide adjustment for any misalignment or mounting variations of the vehicle trailer hitch 126. Column 3, as discussed above, also is easily adjustable, together with end cap assembly 38 to accommodate various height vehicles and also any horizontal alignment which may be required with respect to the vehicle's center line due to the location of the particular trailer hitch used on the vehicle.

The winching mechanism which is used to provide the mechanical advantage for raising and lowering boat 37 with respect to the transporting vehicle, is removably mounted on the boat and need not be attached to the vehicle, as in many prior constructions. Another important advantage of the invention is the reel assembly brake and brake control mechanisms 85 and 112, respectively. This mechanism provides positive control to the operator during the loading and unloading procedures, eliminating any large force being required by the operator, except for a relatively easy cranking motion. This enables even a single individual, regardless of his physical strength and ability, to load and unload a boat onto and off of a vehicle. Stop pins 55 which are mounted in carriage rails 30 insure sufficient movement of carriage 4 along grooved rollers 46 by providing a positive stop upon carriage 4 reaching its predetermined and preselected storage position. Therefore, the boat loader knows when the boat has reached its correct load position without a trial and error procedure being required.

Another advantage of construction 1 is the mounting of reel assembly 5 at a predetermined position transversely across the boat's frame, whereby the boat's weight is utilized during a loading and unloading procedure to reduce the force required on part of the operator to control the boat's movement. A further advantage of construction 1 is the driving engagement of rails 30 on grooved rollers 46 to assist an operator in the intitial unloading procedure. When construction 1 is used on a high vehicle, such as a van, it may be difficult for the operator to start the intitial retraction of the boat rearwardly from its fully stored position. Rotation of shaft 40 by use of a manual crank on squared end 51 (FIG. 13) will rotate rollers 46 and frictionally drivingly engage the rollers with rails 30 to move carriage 4 rearwardly with respect to sleeve 41 until reaching the dot-dash line position of FIG. 5. This retracted position enables the operator to conveniently grasp the rear end of the boat.

Accordingly, improved boat loader and unloader construction 1 provides a relatively simple construction which is removably mounted on a boat and vehicle to enable an individual to load and unload a boat with a minimum of physical effort, yet with positive control of the boat being provided at all times to the operator; and which provides a construction which is effective and safe in use, which avoids difficulties encountered with prior devices, and which achieves the objectives and solves problems existing in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the boat loader and unloader construction is constructed and used, the characteristics of the construction, and the advantageous, new and useful results obtained; the new and useful stuctures, devices, elements, arrangements, parts and combinations, are set forth in the appended claims.

I claim:

1. Boat loader and unloader construction including:
    (a) vertical column means having upper and lower ends, said lower end being adapted to be mounted on the rear of a vehicle and with said upper end being generally level with the top of the vehicle;
    (b) carriage means having first and second ends, said carriage means being pivotally mounted on the upper end of the column means for swinging movement between a lower vertical position and an upper horizontal condition, and being slidably mounted on said upper column end for general horizontal movement between retracted and forward positions;
    (c) clamp means mounted on the first end of the carriage means for clampingly engaging a transom of a boat;
    (d) reel means adapted to be mounted on a central portion of a boat;
    (e) cable means attached to and extending between the reel means and the second end of the carriage means, said cable means being controlled by the reel means to move a boat attached to the reel means between a horizontal upright position and a vertical upstanding position; and
    (f) the carriage means being adapted to pivot about the upper end of the column means for swinging movement of a boat between a vertical upstanding position and an inverted horizontal position, and with said carriage means being adapted to move horizontally along the column means upper end for moving an inverted boat between retracted and forward positions on top of a vehicle.

2. The construction defined in claim 1 in which the column means includes a pair of telescopically joined inner and outer members; and in which adjustment means is provided on the column means for vertically adjusting the inner member with respect to the outer member.

3. The construction defined in claim 2 in which the adjustment means includes a pair of meshed gears each of which is operatively connected to either the inner or outer members; and in which crank means engage the gear means for rotating said gear means for vertically adjusting the inner and outer members with respect to each other.

4. The construction defined in claim 2 in which the inner and outer members have rectangular cross sections.

5. The construction defined in claim 1 in which the reel means includes a pulley take-up member adapted to be mounted on and extend transversely across a boat, and a crank and brake mechanism mounted on said take-up member; and in which the crank and brake mechanism is adapted to be manually actuated for winding and unwinding the cable means on the take-up member during loading and unloading of a boat.

6. The construction defined in claim 5 in which the crank and brake mechanism includes a crank operated shaft, a first ratchet disc mounted on said shaft for rotation therewith, a pair of nonrotatable spaced brake pad means and a rotatable brake disc mounted between said brake pad means and adapted to be clamped therebetween; in which a second ratchet disc is rotationally coupled with the brake disc; and in which the first ratchet disc is engageable with the second ratchet disc to prevent rotation of the shaft upon the brake disc being clamped by the brake pad means.

7. The construction defined in claim 6 in which spring biased lever means is operatively engageable with one of the brake pad means for movement of said brake pad means into and out of engagement with the brake disc.

8. The construction defined in claim 5 in which the reel means has first and second ends; and in which sling means extends between the ends of the reel means and is adapted to extend about the bottom of a boat for mounting the reel means on a boat.

9. The construction defined in claim 8 in which the reel means includes a crank operated sling control means mounted on an end of the take-up member for manually adjusting the sling tension about a boat.

10. The construction defined in claim 9 in which the sling control means has a rotatably mounted shaft operatively engageable with an end of the sling means; and in which detent means is operatively engageable with the said shaft for locking said shaft in a selected position.

11. The construction defined in claim 8 in which the sling means has a closed loop configuration.

12. The configuration defined in claim 1 in which roller means is mounted on the upper end of the column means for slidably and pivotally mounting the carriage means on the column means.

13. The construction defined in claim 12 in which the roller means includes a horizontal sleeve mounted on the column means, a shaft rotatably mounted within the sleeve, a roller mounted on each end of the shaft and rotatable with said shaft, and shroud means rotatably mounted on each end of said shaft and partially enlosing the associated roller; in which the carriage means has a pair of spaced rails; and in which said rails are slidably and pivotally mounted on and within the rollers and shroud means.

14. The construction defined in claim 13 in which clamping means is mounted on the column means for adjustably mounting the horizontal sleeve.

15. In combination with a vehicle having a hitch mounted on the rear of the vehicle, a boat loader and unloader construction including:
   (a) post means adapted to be mounted on the vehicle hitch and extend vertically upwardly therefrom;
   (b) roller means mounted on an upper end of the post means;
   (c) carriage means having first and secnd ends, said carriage means being slidably and pivotally mounted on the roller means for pivotal movement between vertical and horizontal positions and slidable horizontally between forward and retracted positions;
   (d) attachment means mounted on the first end of the carriage means for engagement with a boat transom;
   (e) reel means adapted to be mounted on and extend transversely across a central portion of a boat;
   (f) cable means extending between the reel means and second end of the carriage means for moving a boat secured to the reel means between a horizontal upright position and a vertical upstanding position;
   (g) crank means operatively connected to the reel means for winding the cable means on the reel means when moving a boat from the horizontal to the vertical position; and
   (h) brake means operatively connected to the reel means for controlling the unwinding of the cable means from the reel means when moving a boat from the vertical to the horizontal position.

16. The combination defined in claim 15 in which the post means includes a pair of telescopically engaged members; and in which adjustment means is provided on the post means for vertically adjusting the height of said post means.

17. The combination defined in claim 15 in which the reel means includes take-up tube means and a pair of bearings for rotatably mounting said tube means on a boat; and in which adjustment means is provided on the tube means for adjusting the length of said tube means.

18. The combination defined in claim 15 in which stop means is mounted on the carriage means for limiting the horizontal travel of said carriage means on the roller means.

19. The combination defined in claim 15 in which the carriage means includes a pair of spaced rails; in which the roller means includes a pair of spaced rollers and shroud means rotatably mounted with respect to said rollers and extending over the rollers; and in which the rails extend through the shrouds in sliding supported engagement with the rollers.

20. The combination defined in claim 15 in which the crank means includes a shaft and a pair of ratchet discs adapted to meshingly engage each other; in which one of said discs is mounted on the shaft for rotation therewith and the other of said discs being rotatably mounted on said shaft; and in which the brake means is operatively engageable with said other disc to prevent rotational movement of said other disc which in turn meshingly engages said one disc to prevent rotation of the crank means shaft.

21. The combination defined in claim 20 in which the brake means include a pair of nonrotatable spaced plates and a brake disc mounted therebetween; in which the brake disc is rotatably mounted on the crank means shaft; and in which lever means operatively engages one of the brake plates for moving said one brake plate toward the other brake plate for clamping the brake disc therebetween.

22. The combination defined in claim 21 in which the brake lever means includes a bolt operatively connected to and extending between the spaced brake plates for moving said one brake plate toward said other brake plate; and in which a lever is connected to one end of the bolt for rotating said bolt to move said one brake plate.

23. The combination defined in claim 15 in which sling means is mounted on the reel means and adapted to extend beneath a boat for mounting the reel means on a boat; and in which sling take-up means is mounted on the reel means for tightening the sling means about the boat.

* * * * *